United States Patent [19]

D'Hont

[11] Patent Number: 5,592,150
[45] Date of Patent: Jan. 7, 1997

[54] AIR COIL AND METHOD OF MAKING THE SAME

[75] Inventor: Loek J. D'Hont, Almelo, Netherlands

[73] Assignee: Texas Instruments Incorporated, Dallas, Tex.

[21] Appl. No.: 330,038

[22] Filed: Oct. 27, 1994

[51] Int. Cl.[6] .................................................. G08B 13/14
[52] U.S. Cl. .............................. 340/572; 29/600; 342/51; 343/895
[58] Field of Search ............................. 340/572; 342/44, 342/42, 51; 343/866, 895; 235/492; 29/825, 33 R, 600, 601; 336/170–171

[56] References Cited

U.S. PATENT DOCUMENTS

| | | | |
|---|---|---|---|
| 4,778,552 | 10/1988 | Benge et al. | 340/572 X |
| 4,857,893 | 8/1989 | Carroll | 340/572 |
| 5,053,774 | 10/1991 | Schuemann et al. | 342/44 |
| 5,307,081 | 4/1994 | Harmuth | 343/866 X |
| 5,408,243 | 4/1995 | D'Hont | 343/718 |
| 5,450,088 | 9/1995 | Meier et al. | 342/51 |

FOREIGN PATENT DOCUMENTS

| | | | |
|---|---|---|---|
| 136265 | 4/1985 | European Pat. Off. | 340/572 |
| 2663145 | 12/1991 | France | 340/572 |

*Primary Examiner*—Thomas Mullen
*Attorney, Agent, or Firm*—Ira S. Matsil; James C. Kesterson; Richard L. Donaldson

[57] ABSTRACT

In one aspect, the present invention provides an air coil 20. The air coil 20 may be made from a strip of electrically conductive material 22 which has an insulating material overlying it. For example, the conductive material may comprise copper. The strip 22 is wound into a coil to perform a plurality of windings. The insulating material electrically insulates each of the winding from adjacent ones of the windings.

14 Claims, 5 Drawing Sheets

AIR COIL AND METHOD OF MAKING THE SAME

CROSS REFERENCE TO RELATED APPLICATIONS

The following U.S. patent and commonly assigned applications are hereby incorporated herein by reference:

| Pat. No. | Effective Filing Date | Issue Date | TI Case No. |
| --- | --- | --- | --- |
| 5,053,774 | 07/08/88 | 10/01/91 | TI-12797A |
| 5,450,088 | 11/25/92 | 09/12/95 | TI-16688 |
| 5,408,243 | 01/14/93 | 04/18/95 | TI-16561 |
| 5,471,212 | 04/26/94 | 11/28/95 | TI-18205 |

FIELD OF THE INVENTION

This invention generally relates to identification systems and more specifically to an air coil antenna and a method for making the same.

BACKGROUND OF THE INVENTION

There is a great need for devices or apparatuses which make it possible to identify or detect objects over a certain distance without making contact. In addition, a need exists to be able to change the data stored in, or operating characteristics of, these devices or apparatuses (e.g., "program" the devices or apparatuses).

It is, for example, desirable to request, over a certain distance, identifications which are uniquely assigned to an object. These identifications could be stored in the device or apparatus so that, for example, the object may be identified. A determination may also be made as to whether or not a particular object exists within a given reading range.

As another example, physical parameters such as temperature or pressure can be interrogated directly even when direct contact to the object is not possible. A device or apparatus of the type desired can, for example, be attached to an animal which can then always be identified at an interrogation point without direct contact.

There is also a need for a device which, when carried by a person, permits access checking whereby only persons whose responder unit returns certain identification data to the interrogation unit are allowed access to a specific area. In this case the safeguarding of the data transfer is a very essential factor in the production of such devices.

A further example of a case in which such a device is needed is the computer controlled industrial production in which, without the intervention of operating personnel, components are taken from a store, transported to a production location and there assembled to give a finished product. In this case a device is required which can be attached to the individual components so that the components can be specifically detected in the spares store and taken therefrom.

Several transponder arrangements have been developed. One such transponder arrangement is described in U.S. Pat. No. 5,053,774 issued on Oct. 1, 1991, incorporated herein by reference. This patent describes a transponder unit which has a low energy requirement and does not need its own power source.

Each of these systems, as well as others, requires an antenna for each of the interrogation unit and transponder to transmit and receive signals. Therefore, there is a need for antennas with a high quality factor (Q), light weight, and manufacturable at a low cost.

One air coil 10 which has previously been used as an antenna is illustrated in FIG. 1. The air coil 10 is formed from a cylindrical wire 12 which is wound around a core 14, typically an air gap. The prior art air coil 10, however, has a number of problems. For example, these air coils have a lower Q than is desirable. In addition, smaller and lighter antennas are desired.

SUMMARY OF THE INVENTION

In one aspect, the present invention provides an air coil. In one application, this air coil can be used as an antenna for a transponder or interrogation unit as described in the '774 patent or in other systems such as the ones described in application Ser. No. 07/981,635 or 08/233,839, both of which are incorporated herein by reference. In a first embodiment, the air coil is made from a strip of electrically conductive material and an insulating material which overlies the strip. The strip is wound in a coil to form a plurality of windings. The insulating material electrically insulates each of the windings from adjacent ones of the windings.

The air coil antenna of the present invention is particularly useful with applications which require light, compact antennas but also need high performance. One such application is security badges. The security badge could include a card with an air coil of the present invention incorporated into it. A transponder would then be electrically coupled to the antenna and could be physically attached to the card.

An antenna of the present invention provides an advantage over other devices because of the high quality factor or Q. In this context, the Q is defined as a ratio between the imaginary and real components of the impedance. Since the antenna windings are flat, the Q is high because the distributed capacitance is lower than with standard antennas. In addition, the current distribution in one winding gets better.

Further, the skin effects are minimized because the wire strip has a larger surface area than cylindrical wires. As is known, the skin effect is an effect where current only flows at the surface of the conductor at high frequencies instead of through the whole cross section of a conductor as is the case with a DC current.

Another advantage of an air coil using a strip instead of a wire is the improved fill factor. The fill factor is a measure of the volume of conductor as a percent of the volume of the entire air coil (i.e., conductor and insulator). Since the flat strips stack there is less space between conductor windings than in a honeycomb arrangement as would be found in an air coil formed of cylindrical wire. This improvement in fill factor leads to an air coil which is more compact, lighter and thinner.

BRIEF DESCRIPTION OF THE DRAWINGS

The above features of the present invention will be more clearly understood from consideration of the following descriptions in connection with accompanying drawings in which.

Corresponding numerals and symbols in the different figures refer to corresponding parts unless otherwise indicated.

DETAILED DESCRIPTION OF PREFERRED EMBODIMENTS

The making and use of the presently preferred embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

The following is a description of the air coil of the present invention. The structure of the device will first be described followed by some of the advantages it affords. A method of forming the air coil will then be described along with a few of the modifications. An example of one of the many specific applications, namely a security badge, which may utilize the system will then be described.

Figure 1:
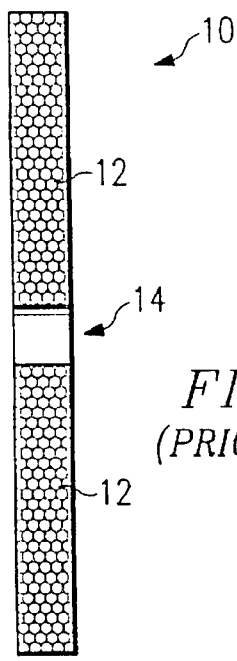
FIG. 1 illustrates a prior art air coil.
Figure 2B:
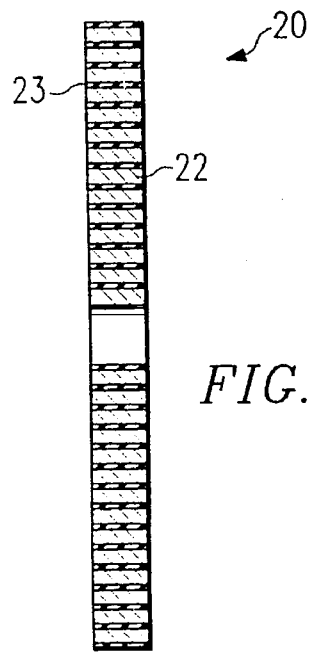
FIGS. 2a and 2b illustrate a first embodiment air coil of the present invention.
Figure 2A:
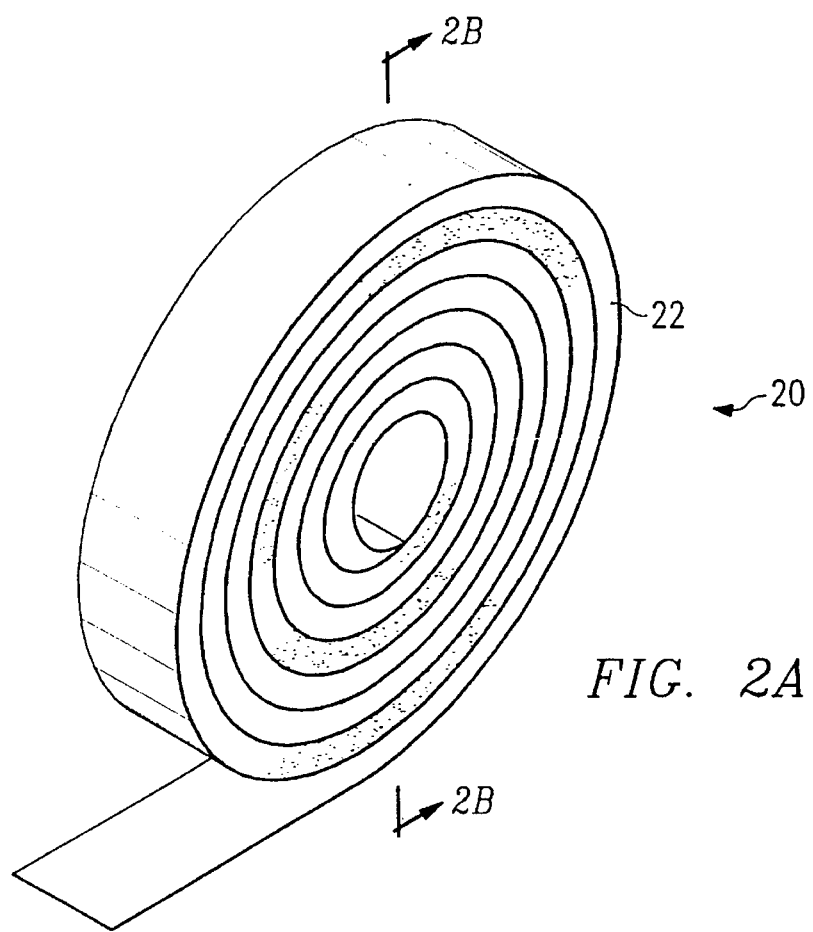

Referring first to FIGS. 2a and 2b, a preferred embodiment air coil 20 is illustrated. The air coil 20 is made from a strip of wire 22 with a substantially rectangular cross section. In a preferred embodiment, the strip 22 is an insulated metal ribbon rather than the standard round wire illustrated in FIG. 1. While copper is the presently preferred material for strip 22, other materials including, but not limited to, aluminum, gold and silver, may be used. As will become clear, magnet wire (i.e., wire coated with a lacquer) may be used. The strip 22 is coiled up as a spiral resulting in a flat spiral wound coil. In other words, the strip 22 is wound in a coil to form a plurality of windings. Insulating material 23 electrically insulates each of the windings from adjacent ones of the windings.

A coil 20 like that illustrated in FIGS. 2a and 2b has excellent RF properties in terms of loss factor (the "Q") due to the low distributed capacitance throughout the coil. This feature is present because each winding layer "sees" only two neighbors, namely the previous turn and the next turn. In a traditional coil 10 (see FIG. 1), this is not the case. Each winding always sees more.

Also, the loss factor is low because the surface area of the copper of the wire conductor 22 is large as compared with a wire with a circular cross section (assuming the same amount of copper for the wire cross sectional area is used). It should be noted that due to the skin effect, the RF current only flows in the wire surface area. Therefore the flatter the wire becomes, i.e., the larger the surface area relative to the cross sectional area, the more efficient use of copper there will be.

Another advantage is that the filling factor in the coil is very good. The filling factor is the ratio of the volume of conductor to the total volume of the air coil. The fill factor is not as high when circular wire 12 is used in air coil 10 since the circles do not fit perfectly into each other. Air gaps between the wire through the coil therefore result. These air gaps, on the other hand, are eliminated in the coil 20 because the flat ribbon 22 can be compressed without any air gaps since flat surfaces abut one another.

A comparison can be made between two coils to demonstrate the advantages of air coil 20 of the present invention. For example, air coil 20 as illustrated in FIG. 2a and 2b can be compared to a traditional wound coil 10 as in FIG. 1. The coil 20 can achieve a quality factor of 90 (i.e., Q=90) with a coil thickness of only 350 µm. The traditional coil, in comparison, requires a thickness of at least twice that to achieve the same Q. In this context, the Q is defined as the imaginary resistance divided by the real resistance or mathematically as $$Q = \frac{\omega L}{R}$$

Since the frequency ω is given for any system, the Q can be maximized by increasing the inductance L or reducing the resistance R. Since the wire strip 22 has a larger surface area for current flow, the resistance R is lower for the coil of the present invention.

Figure 3:
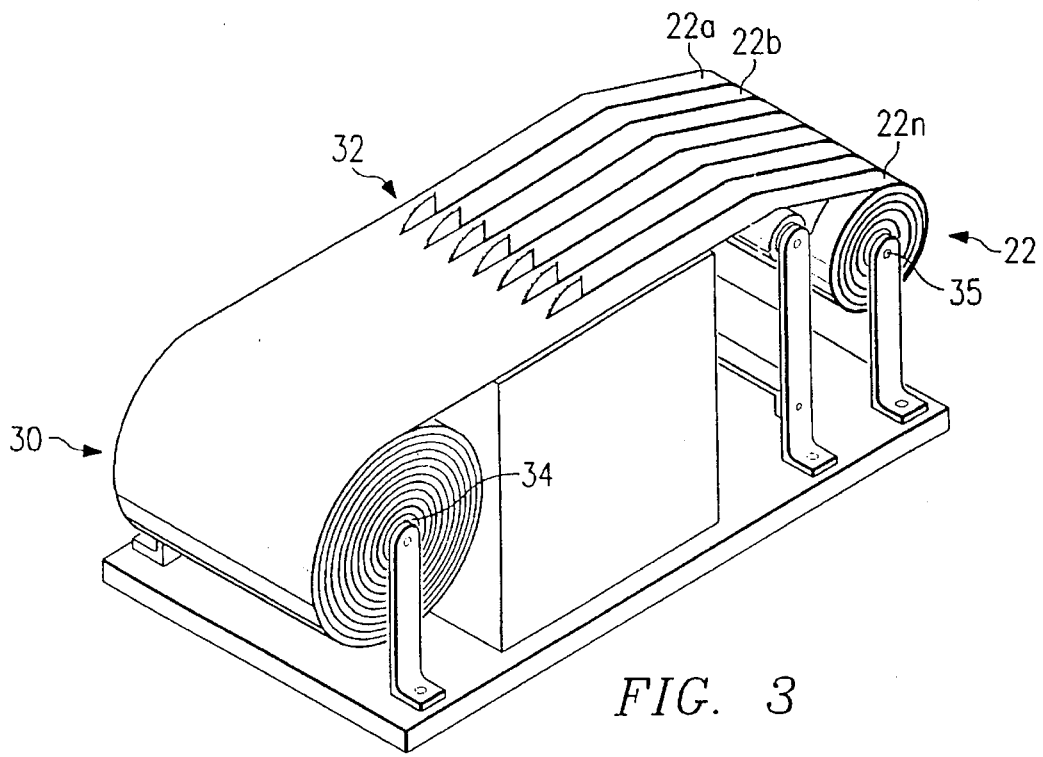
FIG. 3 illustrates a first apparatus for forming an air coil of the present invention.

Two methods of producing the air coil of the present invention will now be described. Referring now to FIG. 3, a sheet of conductive foil 30 (e.g., copper foil) is used as a base material. The conductive foil 30 has an insulating material (not shown) disposed thereon. For example, the insulating material may comprise a lacquer which is coated on one side of the conductive material 30. This foil is sometimes referred to as "magnet wire." In the preferred embodiment the sheet of conductive material 30 is stored on a spool 34.

The foil 30 is rolled off the spool and directed to a cutting device 32. For example, the cutting device 32 may comprise a row of knives separated from each other at fixed distances which will simultaneously cut the foil 30 into ribbons 22a–22n. Although described here is a row of knives, the cutting device 32 may comprise any and all means for cutting the foil 30 into ribbons 22a–22n. For example, the cutting devices 32 may comprise hardened steel or diamond tip material. Any material which is sufficiently hard and will not wear out is desirable.

After the cutting process, each ribbon 22 is wound onto take-up spool 35. The ribbon 22 is wound into a spiral coil as described herein above. The insulating material (not shown) will end up between layers of foil thereby electrically insulating each winding from adjacent windings. In this manner, there will not be any electrical shorts in the coil after the winding process has been completed.

In an embodiment where lacquer is used as the insulating material, the coils 20 are then heated. This heating step causes the lacquer to melt slightly thereby passivating the coil 22 into a fixed self-supporting component. In one embodiment, the heating step may be performed by applying hot air (e.g., between about 130° and 170° C.) for between about 5 and 60 seconds. Of course, however, this heating temperature and time will depend upon the lacquer material used. In an alternate embodiment, the coil can be heated by running a high current through it for a few seconds.

The coils 20 may then be removed from the take-up spool 35. The wire ends may then be pulled out and soldered to the component as required by the specific application.

Figure 4:
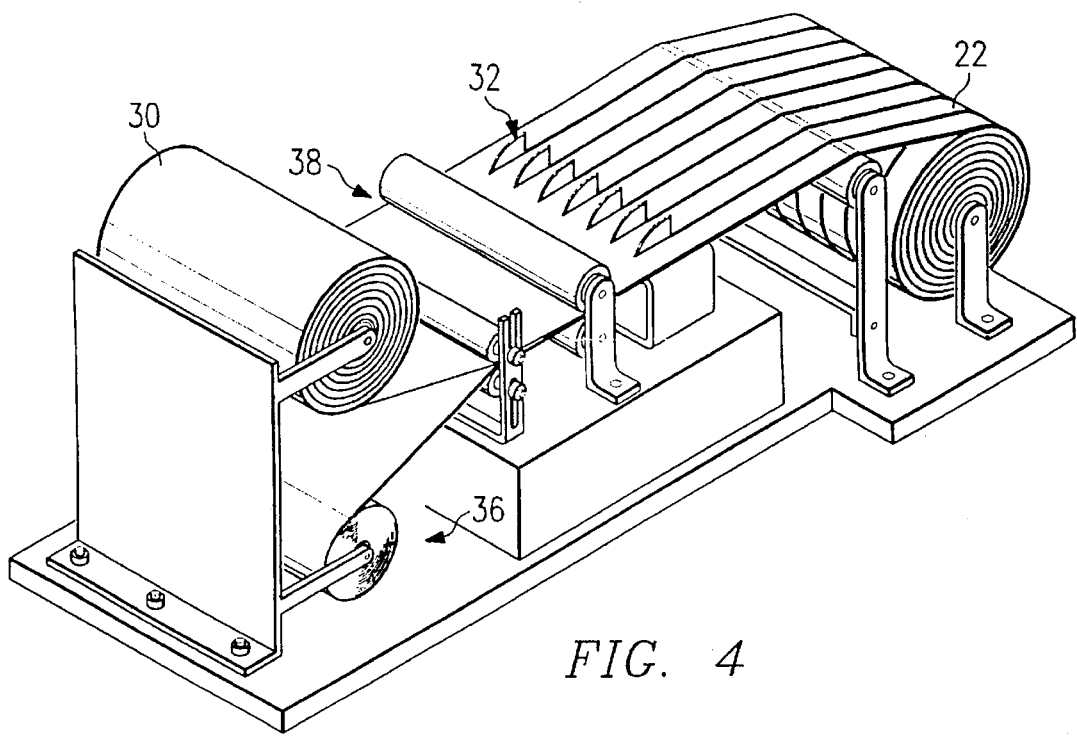
FIG. 4 illustrates a second apparatus for forming the air coil of the present invention.

In an alternate method, illustrated in FIG. 4, a sheet of conductive foil 30 is provided. Rather than providing an insulating coating on the sheet 30, an insulation foil 36 is present as an independent material on a separate roll. The two sheets 30 and 36 are compressed at a pinch roller 38 and rolled into each other. The sheets are then cut with cutting device 32 and formed into the rolls as before.

Figure 5A:
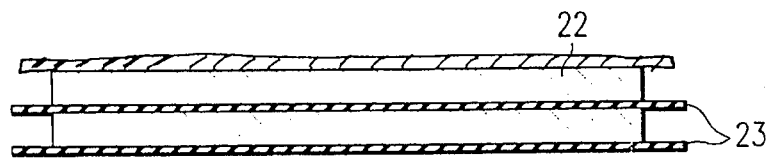
FIGS. 5a–5d illustrate an alternate embodiment coil and the method of forming it.

In an alternate embodiment, the insulation ribbons 23 are cut such that they are wider than the copper ribbons 30 as illustrated in FIG. 5a. As a result, the insulation sheet 23 will "hang-over" compared to the copper sheet 30. When hot air is blown against the plastic overhang after winding, it will melt on the side, thus passivating the coil 20 to a self supporting structure. A portion of a passivated coil 20 is illustrated in FIG. 5b.

Figure 5B:
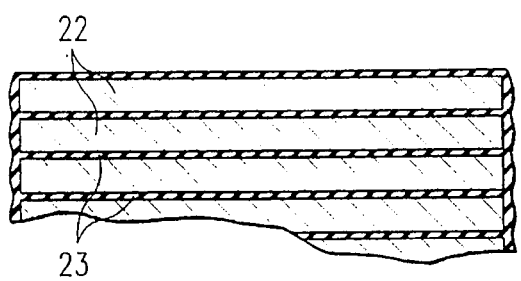
Figure 5C:
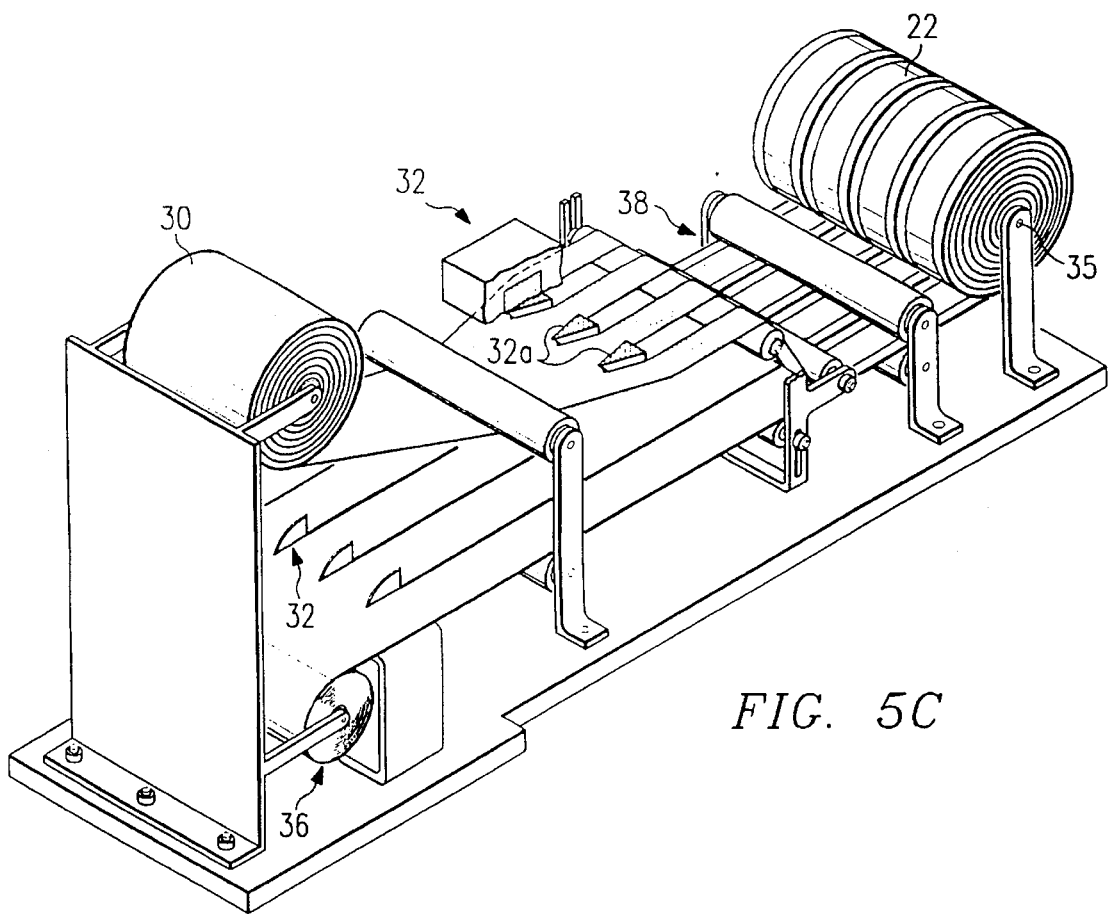

FIG. 5c illustrates a first embodiment apparatus for forming the aircoil illustrated in FIGS. 5a and 5b. Roll 30 of conductive material is fed into a cutting device 32 which includes wedge shaped blades such as blade 32a. The foil is then separated into ribbons and compressed with insulating ribbons 23 which are cut from roll 36. The aircoils 22 are then wound onto a takeup spool 35.

Figure 5D:
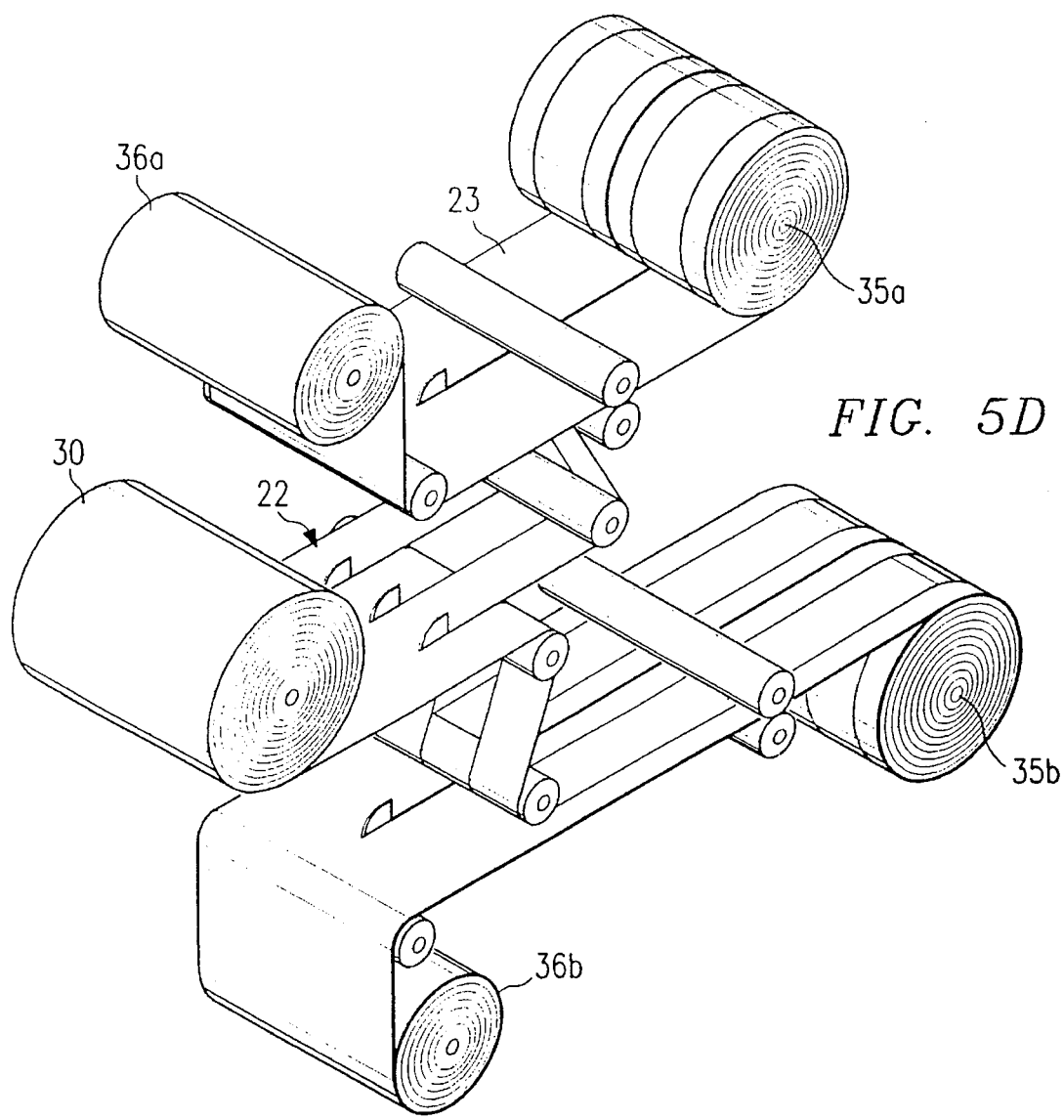

FIG. 5d illustrates a second embodiment apparatus for forming the aircoil illustrated in FIGS. 5a and 5b. In this embodiment, two rolls of insulating material 36a and 36b are provided along with a single roll of conductive material 30. The material on both rolls 36a and 36b are cut into ribbons of a selected width while the material on roll 30 is cut into ribbons of a smaller width. Each conductive ribbon 22 is then compressed with an associated strip 23 of insulating material to form the aircoils. The aircoils may be stored on takeup spools 35a and 35b.

Figure 6:
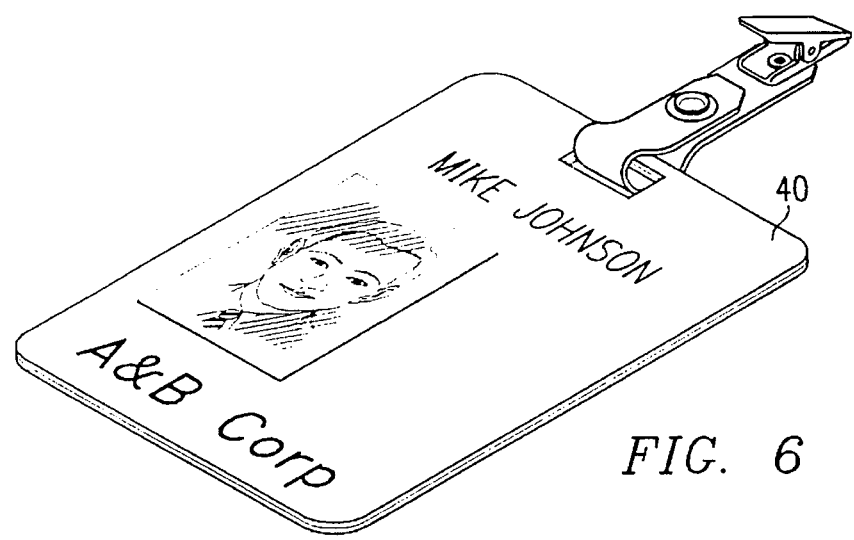
FIG. 6 illustrates a security badge which may be utilized with the present invention.
Figure 7A:
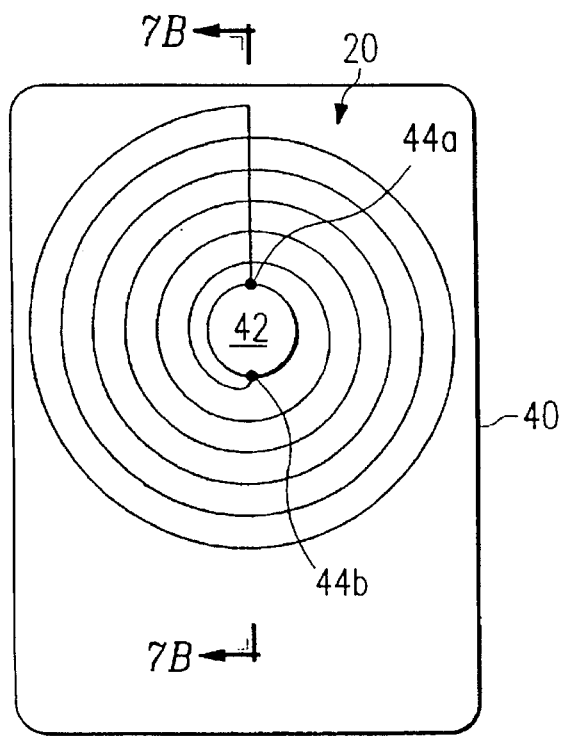
FIGS. 7a and 7b illustrate a security badge with an air coil present invention integrated therewith.
Figure 7B:
Figure 7C:
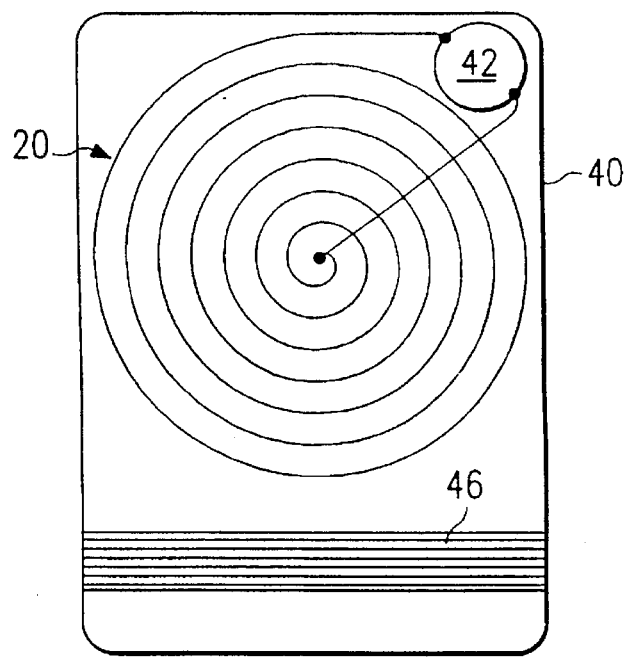
FIG. 7c illustrates an alternate embodiment security badge which also includes a Wiegand strip.

As discussed above, the air coil of the present invention can be used as a transponder antenna in an identification system such as the one discussed in U.S. Pat. No. 5,053,774, incorporated herein by reference. One example of the many applications which can utilized the identification system of the '774 patent, is use with access control such as with a security badge 40 as illustrated in FIG. 6. The air coil of the present invention provides an advantage because it may be integrated with a security badge 40. One such integrated security badge 40 is illustrated in FIG. 7a and in side cross-sectional view in FIG. 7b. A transponder chip 42 is electrically coupled to each of the ends 44a and 44b of the air coil 20. A detailed description of the identification system can be found in the '774 patent which is incorporated herein by reference. As examples, the transponder 42 may be disposed in the center of coil 20 as illustrated in FIG. 7a or in the corner of the badge card 40 as illustrated in FIG. 7c.

A badge 40 with the coil 20 incorporated therein offers an advantage over other security badges because hand-free access is available. In other words, a reader can be attached to a locked door allowing the door to be unlocked without the badge ever being removed from the pocket of an individual holding it. In addition, as illustrated in FIG. 7c, badges carrying other access technologies like Wiegand strip 46 or magnetic strip 46 can also carry a transponder simultaneously since there is no interference between technologies.

To form the security badge 40, the coil 20 is wound between flanges and then passivated by heat treatment or using a solvent. A transponder chip 42 is then soldered to the wire ends and placed in the middle of the coil. The whole subassembly is then laminated between plastic layers. One advantage the coil of the present invention offers is that it can be used to make laminated plastic smart card where the whole card is not thicker than 0.79 mm (ISO thickness similar to standard credit cards).

While described herein in an application using security badge 40, it should be noted that the air coil of the present invention can be used with identification systems in a great variety of applications. The transponder 40 can be attached to or embedded in or simply near an object such as the security badge 40. This object can be almost anything imaginable including tires, baggage, laundry, trash containers, keys, vehicles, or even living animals.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of making an air coil comprising the steps of:

providing a sheet of conductive material;

disposing an insulating material adjacent said sheet of conductive material;

cutting said sheets of conductive material and insulating material into a plurality of strips; and winding each strip into an air coil such that each air coil comprises a plurality of windings wherein said insulating material electrically insulates each of said windings from adjacent ones of said windings.

2. The method of claim 1 wherein said step of disposing an insulating material adjacent said sheet of said conductive material comprises coating said conductive material with a lacquer.

3. The method of claim 2 and further comprising the step of heating at least one of said air coils such that said lacquer melts thereby passivating the coil into a fixed self supporting component.

4. The method of claim 3 wherein at least one of said air coils is heated by blowing hot air on said air coil.

5. The method of claim 3 wherein at least one of said air coils is heated by causing a current to flow through said coil.

6. The method of claim 1 wherein said step of disposing an insulating material adjacent said sheet of conductive material comprises pressing a sheet of insulating material against said sheet of conductive material.

7. The method of claim 1 wherein said step of cutting said sheets of conductive material and insulating material comprises cutting said insulating material such that strips of said insulating material are wider than strips of said strips of said conductive material.

8. The method of claim 7 and further comprising the step of heating at least one of said air coils such that said strip of insulating material of said at least one air coil passivates said at least one air coil.

9. The method of claim 1 wherein said step of providing a sheet of conductive material comprises providing a sheet of copper.

10. An air coil formed from a method comprising the steps of:

providing a sheet of conductive material;

disposing an insulating material adjacent said sheet of conductive material;

cutting said sheet of conductive material and said adjacent insulating material into a plurality of strips; and winding one of said strips into said air coil such that said air coil comprises a plurality of windings wherein said insulating material electrically insulates each of said windings from adjacent ones of said windings.

11. An apparatus for use in making an air coil, said apparatus comprising:

a first spool for storing a sheet of electrically conductive material;

a cutting apparatus for cutting said sheet of electrically conductive material and an insulating material into a plurality of ribbon-like strips; and a winding apparatus for winding each strip into an air coil such that each air coil comprises a plurality of windings wherein said insulating material electrically insulates each of said windings from adjacent ones of said windings.

12. The apparatus of claim 11 wherein said sheet of electrically conductive material has a lacquer coating formed thereon such that said insulating material comprises said lacquer coating.

13. The apparatus of claim 11 and further comprising means for heating each of said air coils.

14. The apparatus of claim 11 and further comprising:

a second spool for storing a sheet of said insulating material; and a pinch roller for guiding said sheet of electrically conductive material into a closely adjacent position with said sheet of insulating material.

* * * * *